US008446908B2

(12) United States Patent
Kang (10) Patent No.: US 8,446,908 B2
(45) Date of Patent: May 21, 2013

(54) APPARATUS AND METHOD FOR REORDERING DATA PACKETS IN COMMUNICATION SYSTEM (75) Inventor: Dong-Jun Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 13/004,280

(22) Filed: Jan. 11, 2011

(65) Prior Publication Data

US 2011/0170548 A1 Jul. 14, 2011

(30) Foreign Application Priority Data

Jan. 13, 2010 (KR) ........................ 10-2010-0003259

(51) Int. Cl.
*H04L 12/28* (2006.01)
(52) U.S. Cl.
USPC .......................... 370/394; 370/474; 714/748
(58) Field of Classification Search
None
See application file for complete search history.

(56) References Cited

U.S. PATENT DOCUMENTS

| | | | | |
|---|---|---|---|---|
| 7,187,677 B2 * | 3/2007 | Torsner et al. | ................ | 370/394 |
| 7,522,526 B2 * | 4/2009 | Yi et al. | ........................ | 370/236 |
| 7,761,767 B2 * | 7/2010 | Chandra et al. | ................ | 714/751 |
| 7,957,389 B2 * | 6/2011 | Hu | ................................ | 370/394 |
| 7,961,657 B2 * | 6/2011 | Cave et al. | ..................... | 370/310 |
| 8,036,129 B2 * | 10/2011 | Yi et al. | ......................... | 370/236 |
| 8,050,178 B2 * | 11/2011 | Yi et al. | ......................... | 370/235 |
| 8,254,259 B2 * | 8/2012 | Yi et al. | ......................... | 370/236 |
| 8,295,159 B2 * | 10/2012 | Maheshwari et al. | ........ | 370/216 |
| 2005/0220032 A1 * | 10/2005 | Hu | ................................ | 370/244 |
| 2006/0062223 A1 * | 3/2006 | Manuel et al. | ................ | 370/394 |
| 2009/0092077 A1 * | 4/2009 | Pirskanen et al. | ............ | 370/328 |
| 2009/0175222 A1 * | 7/2009 | Yi et al. | ........................ | 370/328 |

* cited by examiner

*Primary Examiner* — Michael J Moore, Jr.
(74) *Attorney, Agent, or Firm* — Jefferson IP Law, LLP (57) ABSTRACT

An apparatus and method for reordering data packets in a communication system are provided. The method includes detecting that a first time value of a timer used for reordering data packets needs to be set when a missing data packet occurs in receiving data packets, and, when the timer restarts, setting the first time value to a time value determined by compensating for a second time value which is used when the timer starts. The timer starts when a first Transmission Sequence Number (TSN) of a received data packet is greater than a TSN of a data packet which is expected to be received immediately after data packets received already and when the timer is not in an active state. The timer expires at a point of time when the second time value lapses. The timer stops when a data packet with the same TSN as the first TSN is sent as a reassembly entity before the expiring of the timer. The timer restarts when a received data packet which cannot be sent as the reassembly entity is buffered in a buffer after the stopping or the expiring of the timer.

16 Claims, 6 Drawing Sheets

APPARATUS AND METHOD FOR REORDERING DATA PACKETS IN COMMUNICATION SYSTEM

PRIORITY

This application claims the benefit under 35 U.S.C. §119 (a) of a Korean patent application filed in the Korean Industrial Property Office on Jan. 13, 2010, and assigned Serial No. 10-2010-0003259, the entire disclosure of which is hereby incorporated by reference.

BACKGROUND OF THE INVENTION

1. Field of the Invention

The present invention relates to an apparatus and method for controlling a communication system. More particularly, the present invention relates to an apparatus and a method for reordering data packets in a communication system.

2. Description of the Related Art

The next generation communication system is being developed to provide high-speed and large-capacity services to Mobile Stations (MSs). As an example of a next generation communication system, there is a High Speed Packet Access evolution (HSPA+) communication system.

The HSPA+ communication system includes a layer structure. In order to send data packets received from Layer 1 to Layer 2 while ensuring in-sequence delivery, the HSPA+ communication system performs a reordering on the data packets received in a Medium Access Control (MAC) layer, that is, the MAC-enhanced high speed (ehs) entity, and sends the reordered data packets to a Radio Link Control (RLC) layer. Herein, the reordering of the data packets is performed in a reordering block included in the MAC-ehs entity. When the data packets are not received sequentially, the received data packets are reordered to ensure the in-sequence delivery using a T1 timer.

In the HSPA+ communication system, the operations of the T1 timer are defined, and the descriptions thereof are as follows.

(1) Starting of T1 Timer

In the case where a Transmission Sequence Number (TSN) of the received data packet is greater than the Next Expected TSN (NET), when the T1 timer is not in an active state, the T1 timer starts and the T1_TSN is set to the TSN of the currently received data packet which is greater than the NET. Herein, the NET denotes the TSN of the data packet which is expected for the reordering block to receive immediately after the currently received data packet. Further, the T1_TSN denotes a variable which is managed only when the T1 timer is in the active state, and the T1_TSN is discarded when the T1 timer expires.

In the HSPA+ communication system, there is a requirement that only one T1 timer may be in the active state during a predetermined time period when the TSN of the received data packet is greater than the NET and the T1 timer is in the active state. Therefore, in accordance with the requirement, when one of the T1 timers is in the active state, another T1 timer does not start.

(2) Stopping of T1 Timer

Before the T1 timer expires, if the reordering block sends the data packet with the TSN identical to the T1_TSN to a reassembly entity included in the MAC-ehs entity, the T1 timer stops. That is, when the reordering block receives a missing data packet, the T1 timer stops.

(3) Expiring of T1 Timer

If the T1 TSN is greater than the NET when the T1 timer expires, the data packets with TSNs ranging from T1_TSN to NET are sent to the reassembly entity. Further, the received data packets from the data packet with the T1_TSN to the missing data packet are sent to the reassembly entity. Further, the NET is set to the TSN of a data packet which is not yet received.

(4) Restarting of T1 Timer

If the T1 timer stops or expires and there is a data packet which cannot be sent to the reassembly entity, the T1 timer restarts and the T1_TSN is set to the largest TSN among the TSNs of the data packets which cannot be sent to the reassembly entity. In this case, the T1_TSN has the same value as the RcvWindow_UpperEdge. Herein, the RcvWindow_UpperEdge refers to the upper edge of a receiving window.

As described above, in Layer 2 of the HSPA+ communication system, the T1 timer operates, that is, starts, stops, expires or restarts to ensure in-sequence delivery.

However, in the HSPA+ communication system, there are only definitions for starting, stopping, expiring and restarting of the T1 timer for the in-sequence delivery. Accordingly, there is a need for an operation for reordering data packets using the T1 timer.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reordering data packets in a communication system.

Another aspect of the present invention is to provide an apparatus and a method for reordering data packets by compensating for a standby time of a missing data packet in a communication system.

Yet another aspect of the present invention is to provide an apparatus and a method for reordering data packets by compensating for a combining time of a missing data packet in a communication system.

According to an aspect of the present invention, an apparatus for reordering data packets in a communication system is provided. The apparatus includes a controller for detecting that a first time value of a timer used for reordering data packets needs to be set when a missing data packet occurs in receiving data packets, and, when the timer restarts, for setting the first time value to a time value determined by compensating for a second time value which is used when the timer starts, and a plurality of buffers for accumulating received data packets. The timer starts when a first Transmission Sequence Number (TSN) of a received data packet is greater than a TSN of a data packet which is expected to be received immediately after data packets received already and when the timer is not in an active state. Further, the timer expires at a point of time when the second time value lapses. Also, the timer stops when a data packet with the same TSN as the first TSN is sent to a reassembly entity before the expiring of the timer. Further, the timer restarts when a received data packet which cannot be sent to the reassembly entity is buffered in a buffer after the stopping or the expiring of the timer.

According to another aspect of the present invention, a method for reordering data packets in a communication system is provided. The method includes detecting that a first time value of a timer used for reordering data packets needs to be set when a missing data packet occurs in receiving data packets, accumulating received data packets, and, when the timer restarts, setting the first time value to a time value determined by compensating for a second time value which is used when the timer starts. The timer starts when a first TSN of a received data packet is greater than a TSN of a data packet which is expected to be received immediately after data packets received already and when the timer is not in an active state. Further, the timer expires at a point of time when the second time value lapses. Further, the timer stops when a data packet with the same TSN as the first TSN is sent to a reassembly entity before the expiring of the timer. Further, the timer restarts when a received data packet which cannot be sent to the reassembly entity is buffered in a buffer after the stopping or the expiring of the timer.

According to yet another aspect of the present invention, a method for reordering data packets in a communication system is provided. The method includes receiving and buffering data packets, determining that a data packet is missing from among the received data packets, determining that a first time value of a timer used for reordering the missing data packet needs to be set, setting the first time value to a value received from an upper layer if the timer does not need to be restarted, and setting the first time value to a value determined by compensating for a second time value if the timer needs to be restarted.

According to exemplary aspects of the present invention, the resending requests of the missing data packets can be effectively prevented from being delayed by compensating for standby times of the missing data packets and by reordering the data packets in a communication system. Further, according to exemplary aspects of the present invention, an effective software load balancing can be made by compensating for the standby times of the missing data packets and reordering the data packets in a communication system. Therefore, the management efficiency of the total packet data is effectively increased. Further, the data packets to be discarded can be minimized by compensating for the combining times of the missing data packets and reordering the data packets in a communication system. Therefore, the wireless communication resource efficiency is increased, and the signaling overhead is effectively reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose an apparatus and a method for reordering data packets in a communication system. Further, exemplary embodiments of the present invention propose an apparatus and a method for reordering data packets by compensating for the standby times of missing data packets. Further, exemplary embodiments of the present invention propose an apparatus and a method for reordering data packets by compensating for the combining times of missing data packets.

In exemplary embodiments of the present invention, it is assumed that the communication system is a High Speed Packet Access evolution (HSPA+) communication system. It is a matter of course that the apparatus and the method for reordering data packets proposed according to exemplary embodiments of the present invention may be used in any other communication system as well as the HSPA+ communication system.

Figure 1:
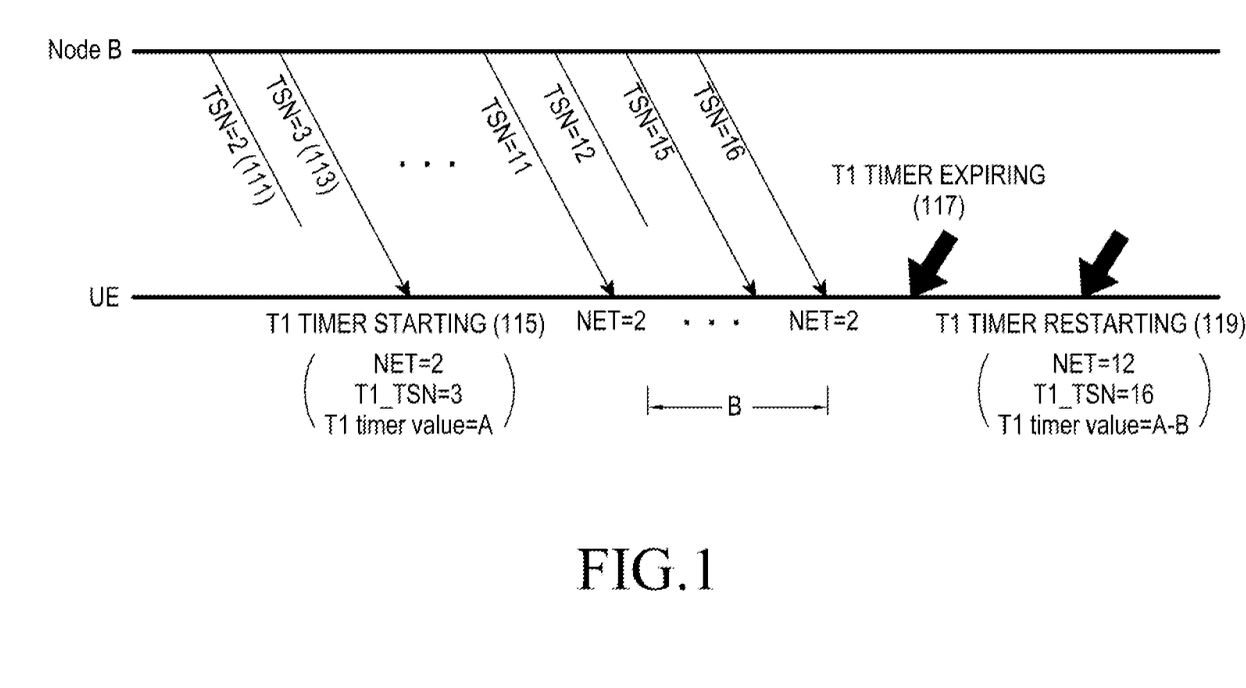
FIG. 1 is a diagram schematically illustrating a method for reordering data packets by compensating for the standby times of missing data packets in a High Speed Packet Access evolution (HSPA+) communication system according to a an exemplary embodiment of the present invention.

FIG. 1 is a diagram schematically illustrating a method for reordering data packets by compensating for the standby times of missing data packets in an HSPA+ communication system according to an exemplary embodiment of the present invention.

An HSPA+ communication system of the related art uses a T1 timer for in-sequence delivery of data packets. For the T1 timer, a starting operation, a stopping operation, an expiring operation, and a restarting operation are defined. When restarting, the T1 timer uses the same time value as when the T1 timer starts for the first time. In the following description, the time value used by the T1 timer is referred to as "T1 time value" for convenience of explanation. The T1 time value represents a possible time for standby of the T1 timer. In an HSPA+ communication system of the related art, the T1 time value of the T1 timer is set to a value received from an upper layer. That is, the T1 time value of the T1 timer is not set in consideration of a point of time when the second missing data packet occurs, but it is set to the value received from the upper layer. Therefore, in the case where the missing data packet is not received from the point of time when the T1 timer expires, the T1 time value is set to a value longer than is actually necessary. That is, the T1 time value is not set by compensating for the standby time from the point of time when the missing data packet occurs to the point of time when the T1 timer restarts, but it is set to the value received from the upper layer. Therefore, a resending request of the missing data packet is delayed in a Radio Link Control (RLC) layer, and there may be problems in terms of a software load unbalancing.

Referring to FIG. 1, problems which may occur since the T1 time value is not set by compensating for the standby time of the missing data packet but is instead set by receiving a value from the upper layer will be described.

First, when a reordering block included in a Medium Access Control (MAC)-enhanced high speed (ehs) entity, which is a MAC layer of a User Equipment (UE), receives a data packet with a Transmission Sequence Number (TSN) of 3 (113) without receiving the data packet with TSN=2 (111), the T1 timer starts (115). Herein, the T1 time value of the T1 timer is set to a value received from the upper layer. For example, it is assumed that the T1 time value is set to 100 ms.

Hereinafter, when the data packet with TSN=2 is not received before the T1 timer expires (117), the reordering block sends the data packets with continuous TSNs among the data packets buffered in the buffers so far, that is, the data packets with from TSN=3 to TSN=11, to a reassembly entity included in the MAC-ehs entity. However, since the data packet with TSN=12 is also missed, the reordering block restarts the T1 timer (119). In this case, the T1 time value of the T1 timer is also set to the value received from the upper layer without compensating for the standby time of the data packet with TSN=12. As such, the T1 time value is not set by compensating for the standby time of the missing data packet but by receiving the value from the upper layer. Therefore, as described above, the resending request for the missing data packet is delayed in the RLC layer, and there may be problems in terms of a software load unbalancing. In FIG. 1, there appears to be time gaps between a time period from after receiving the data packet with TSN=16 to the point of time (117) when the T1 timer expires and a time period from the point of time (117) when the T1 timer expires to the point of time (119) when the T1 timer restarts. However, it should be noted that it is illustrated only for convenience of explanation and there is no time gap therebetween.

Therefore, in an exemplary embodiment of the present invention, the T1 time value of the T1 timer is set by compensating for the standby time of the missing data packet. By this, an exemplary method for reordering data packets by compensating for the standby times of the missing data packets is proposed.

Referring again to FIG. 1, when receiving the data packet with TSN=3 (113) without receiving the data packet with TSN=2 (111), the reordering block starts the T1 timer (115). Herein, the T1 time value of the T1 timer is set to a value received from the upper layer, and for example, it is assumed to be set to A ms. Hereinafter, when the reordering block has not received the data packet with TSN=2 before the T1 timer expires (117), the reordering block sends the data packets with continuous TSNs among the data packets buffered in the buffers so far, that is, the data packets with from TSN=3 to TSN=11, to the reassembly entity. Then, the upper layer issues a resending request for the missing data packets. Since this departs from the scope of the present invention, the description thereof will be omitted. However, since the data packet with TSN=12 is missed, the reordering block restarts the T1 timer (119).

In this case, the T1 time value of the T1 timer is not set to the predetermined time value, that is, A ms, when the T1 timer starts but to A-B ms which is a value determined by compensating for the standby time of B ms from the data packet with TSN=12 to the data packet with TSN=16 in order to compensate for the data packet with TSN=12. Herein, the data packet with TSN=16 is the last data packet received immediately before the T1 timer expires. Therefore, in an exemplary embodiment of the present invention, the time required in waiting for the missing data packet is determined as the amount of time from the point of time when the data packet with TSN=12 should be received to the point of time when the data packet with TSN=16 is received. Further, the determined time value is subtracted from the time value which is set by the T1 timer when it starts. Then, the resultant time value is set to the value of the T1 timer which restarts after waiting for receipt of the data packet with TSN=2.

Thus, when the T1 timer restarts as described above, if the T1 time value of the T1 timer is set by compensating for the standby time of the missing data packet, a time allocated for the T1 timer to expire is shortened as compared to the case where the T1 timer restarts in the HSPA+ communication system of the related art. As such, if the wireless communication environment does not provide a good channel, it may be more efficient to set the T1 time value of the T1 timer by compensating for the standby time of the missing data packet when the T1 timer restarts. This will be described as follows.

As an example, in a case where the UE has sent a Not Acknowledgement (NACK) signal for the received data packet but the Node B determines the signal as an Acknowledgement (ACK) in error, the UE has to wait for the data packet corresponding to the NACK signal until the T1 timer expires in the circumstance that the Node B resends the corresponding data packet. In this case, if the T1 time value of the T1 timer is set by compensating for the standby time of the missing data packet, the resending request can proceed more rapidly for the missing data packet in the RLC layer. Also, the data packets which are not sent to the RLC layer but buffered in the buffer of the reordering block can be processed in a distribution manner. Therefore, the software load can be reduced.

Next, another method for reordering data packets by compensating for the standby time of a missing data packet in an HSPA+ communication system according to an exemplary embodiment of the present invention will be described with reference to FIG. 2.

Figure 2:
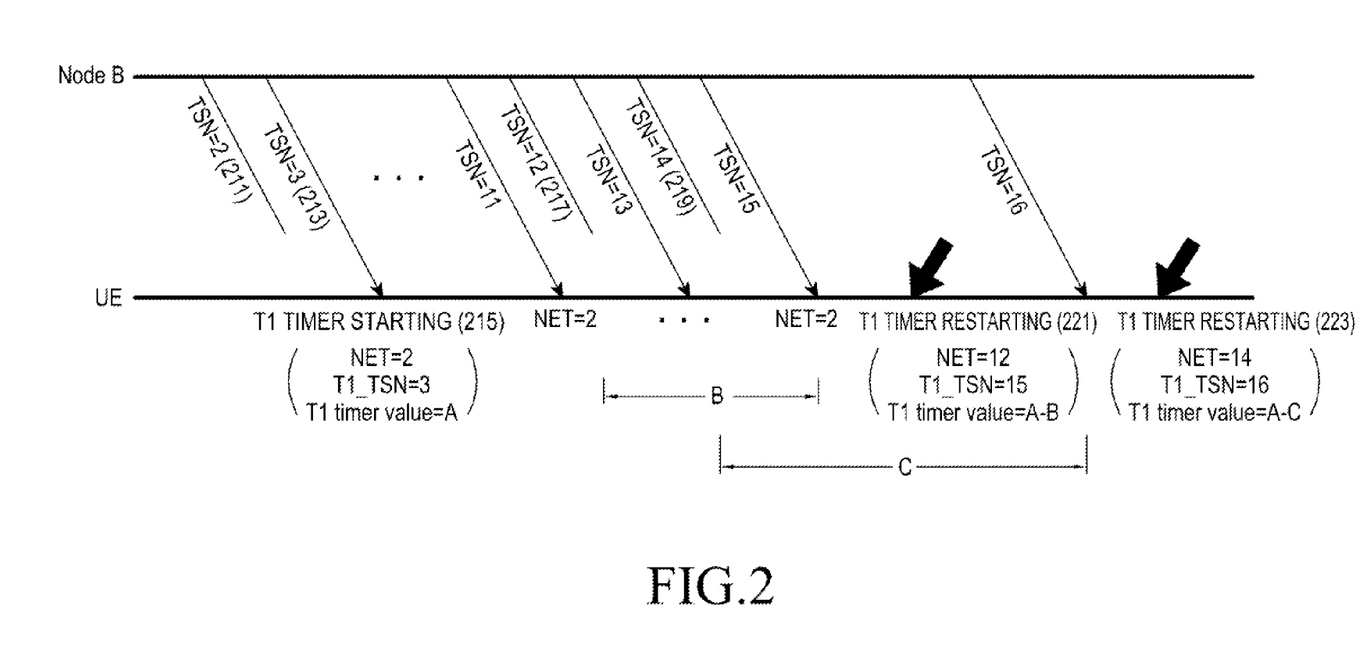
FIG. 2 is a diagram schematically illustrating a method for reordering data packets by compensating for the standby times of missing data packets in an HSPA+ communication system according to an exemplary embodiment of the present invention.

FIG. 2 is a diagram schematically illustrating a method for reordering data packets by compensating for the standby times of missing data packets in an HSPA+ communication system according to an exemplary embodiment of the present invention.

Referring to FIG. 2, when receiving the data packet with TSN=3 (213) without receiving the data packet with TSN=2 (211), the reordering block starts the T1 timer (215). Herein, the T1 time value of the T1 timer is set to a value received from the upper layer, and for example, it is assumed to be set to A ms. Hereinafter, when the data packet with TSN=2 is not received before the T1 timer expires, the reordering block sends the data packets with continuous TSNs among the data packets buffered in the buffers so far, that is, the data packets with from TSN=3 to TSN=11, to the reassembly entity. However, since the data packet with TSN=12 is missed (217), the reordering block restarts the T1 timer (221). In this case, the T1 time value of the T1 timer is not set to the predetermined time value, that is, A ms, when the T1 timer restarts but to A-B ms which is a value determined by compensating for the standby time of B ms from the data packet with TSN=12 to the data packet with TSN=15 in order to compensate for the missing data packet with TSN=12. In an exemplary embodiment of the present invention, since the data packet with TSN=15 is received immediately before the point of time when the T1 timer restarts (221), the T1 timer restarts at the point of time denoted by reference number 221 in consideration of the time duration from the point of time when the data packet with TSN=12 is missed to the point of time when the data packet with TSN=15 is received.

Thereafter, when the data packet with TSN=12 is not received before the T1 timer expires, the reordering block sends the data packets with continuous TSNs among the data packets buffered in the buffers so far, that is, the data packet with TSN=13, to a reassembly entity. However, since the data packet with TSN=14 is missed (219), the reordering block restarts the T1 timer (223) in order to wait for the missing data packet with TSN=14. In this case, the T1 time value of the T1 timer is not set to the predetermined time value, that is, A ms, when the T1 timer restarts, but to A-C ms which is a value determined by compensating for the standby time of C ms from the data packet with TSN=14 to the data packet with TSN=16 in order to compensate for the data packet with TSN=14. Herein, since the point of time when the data packet with TSN=16 is received is already used for waiting for the data packet with TSN=14, when the T1 timer restarts in order to wait for the data packet with TSN=14 at reference number 223, the value of the T1 timer is set to a value determined by subtracting the standby time.

In FIG. 2, there seem to be time gaps between the point of time when the data packet with TSN=15 is received and the point of time when the T1 timer restarts in order to wait for the reception of the data packet with TSN=12, and between the point of time when the data packet with TSN=16 is received and the point of time denoted by reference number 223. However, it should be noted that these time gaps are illustrated for convenience in explanation and are actually small enough to be ignored.

On the other hand, as described in the previous exemplary embodiment of the present invention, it is preferable that the method for reordering the data packets by compensating for the standby time of the missing data packet is used in the case where the data packets received during one Transmission Time Interval (TTI) have the type of complete MAC-ehs Service Data Unit (complete MAC-ehs SDU).

Next, an exemplary method for reordering data packets by compensating for the combining time of a missing data packet will be described when the complete MAC-ehs SDU and the segment of the MAC-ehs SDU are mixed with each other and received during one TTI.

Figure 3A:
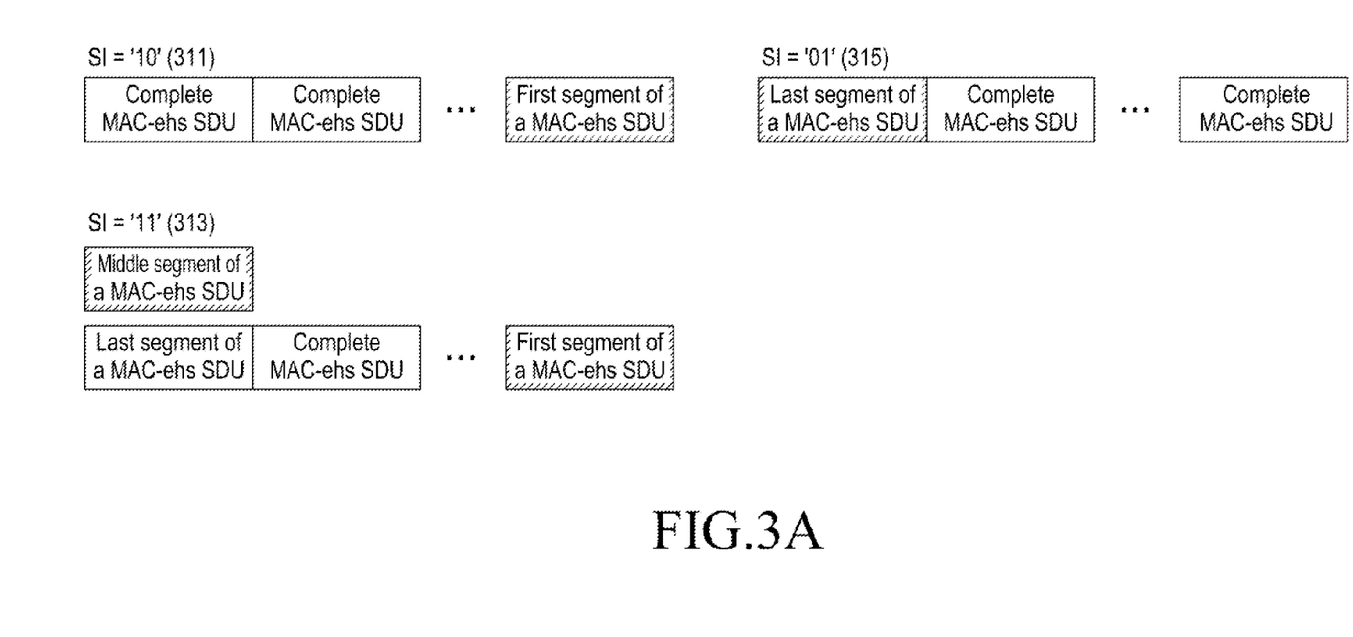
FIGS. 3A and 3B are diagrams schematically illustrating a method for reordering data packets by compensating for the combining times of missing data packets in an HSPA+ communication system according to an exemplary embodiment of the present invention.
Figure 3B:
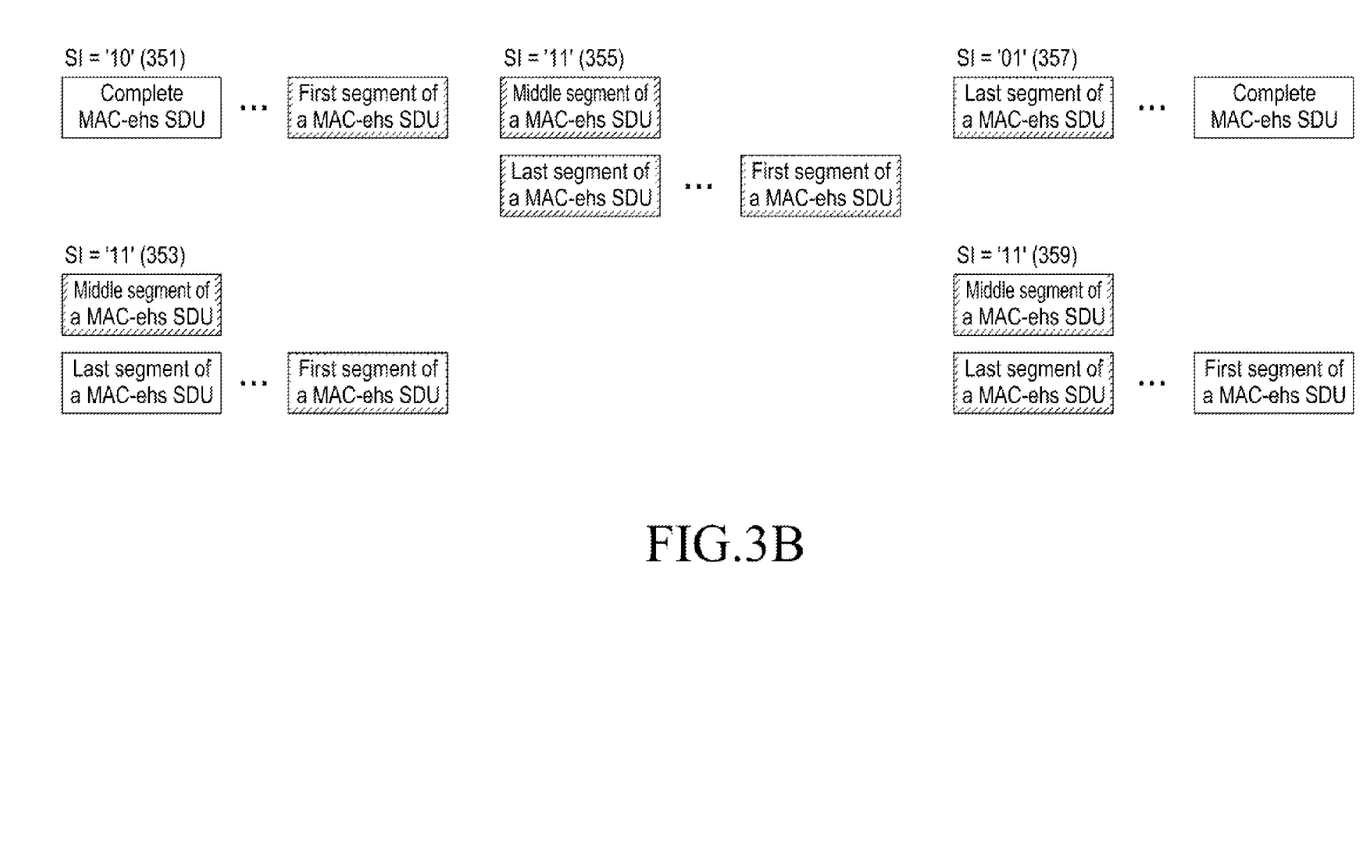

FIGS. 3A and 3B are diagrams schematically illustrating a method for reordering data packets by compensating for the combining times of missing data packets in an HSPA+ communication system according to an exemplary embodiment of the present invention.

Before describing FIGS. 3A and 3B, it should be noted that the MAC-ehs Packet Data Unit (PDU) in the HSPA+ communication system includes a header field, reordering PDUs, and a padding field. The header field includes a Logical Channel Identifier (LCH-ID) field, a Length (L) field, a Segmentation Indication (SI) field, and a Flag (F) field. Herein, the SI field has one of 4 field values below, and the meaning of each field value is shown in Table 1 below.

TABLE 1

| SI Field | Segmentation indication |
|---|---|
| 00 | The first reordering SDU of the reordering PDU is a complete MAC-ehs SDU. The last reordering SDU of the reordering PDU is a complete MAC-ehs SDU. |
| 01 | If there are more than one reordering SDUs in the reordering PDU, the last reordering SDU of the reordering PDU is a complete MAC-ehs SDU. The first reordering SDU of the reordering PDU is the last segment of a MAC-ehs SDU. |
| 10 | If there are more than one reordering SDUs in the reordering PDU, the first reordering SDU of the reordering PDU is a complete MAC-ehs SDU. The last reordering SDU of the reordering PDU is the first segment of a MAC-ehs SDU. |
| 11 | If there are more than one reordering SDUs in the reordering PDU, the first reordering SDU of the reordering PDU is the last segment of a MAC-ehs SDU and the last reordering SDU of reordering PDU is the first segment of a MAC-ehs SDU. If there is only one reordering SDU in the reordering PDU, the reordering SDU is a middle segment of a MAC-ehs SDU. |

In Table 1, an SI field value of "00" represents that the first reordering SDU of the reordering PDU is the complete MAC-ehs SDU, and the last reordering SDU of the reordering PDU is also the complete MAC-ehs SDU. An SI field value of "01" represents that when there are one or more reordering SDUs in the reordering PDU, the last reordering SDU of the reordering PDU is the complete MAC-ehs SDU, and the first reordering SDU is the last segment of a MAC-ehs SDU. An SI field value of "10" represents that when there are one or more reordering SDUs in the reordering PDU, the first reordering SDU of the reordering PDU is the complete MAC-ehs SDU, and the last reordering SDU is the first segment of a MAC-ehs SDU. An SI field value of "11" represents that when there are one or more reordering SDUs in the reordering PDU, the first reordering SDU of the reordering PDU is the last segment of a MAC-ehs SDU, and the last reordering SDU of the reordering PDU is the first segment of a MAC-ehs SDU.

The previous exemplary embodiment of the present invention has been described regarding the case where the T1 time value is set by compensating for the standby time of the missing data packet. However, as the missing data packet occurs, when the segment of the MAC-ehs SDU is buffered in the buffer of the reordering block and the T1 timer restarts, the T1 time value of the T1 timer is set to a value received from the upper layer. Even though the value received from the upper layer is used as it is for the T1 time value of the T1 timer, it is different from the case where the T1 time value of the T1 timer in the HSPA+ communication system is set to a value received from the upper layer. The reason is to reduce redundancy of resending a request in the RLC layer by extending the standby time for the data packet which is combined with the segment of the MAC-ehs SDU buffered in the buffer of the reordering block.

Finally, the value received from the upper layer is used as it is for the T1 time value of the T1 timer in the exemplary embodiment of the present invention currently described, thereby compensating for the combining time of the segment of the MAC-ehs SDU buffered in the buffer of the reordering block. Specifically, in the currently described exemplary embodiment of the present invention, there has been described the case where the combining time of the segment of the MAC-ehs SDU buffered in the buffer of the reordering block is compensated for using the value received from the upper layer as the T1 time value of the T1 timer. However, it is a matter of course that the T1 time value may not be set to the value received from the upper layer but also a value determined by compensating for the value received from the upper layer with the standby time of the missing data packet and the combining time. As a result, an advantage of using the value received from the upper layer as the T1 time value when the T1 timer restarts is that the T1 time value is set to a value determined by compensating for the combining value. Herein, the value which is determined by compensating for the standby time of the missing data packet and the combining time means a value generated by adding the combining time with a value determined by subtracting the standby time from the value received from the upper layer.

In the case where the value of the SI field is "01" or "11", when the T1 timer restarts, the T1 time value of the T1 timer is not set to the time value determined by compensating for the standby time of the missing data packet but to the time value received from the upper layer as described in the previous exemplary embodiment of the present invention. In the case where the value of the SI field is "00" or "10", when the T1 timer restarts, the T1 time value of the T1 timer is set to the time value determined by compensating for the standby time of the missing data packet as described in the previous exemplary embodiment of the present invention. As such, since the T1 time value of the T1 timer is set according to the SI field value, it is possible to divide the data packets which can be processed in the MAC layer from the data packets which can be processed in the RLC layer, thereby improving the performance of the UE.

FIG. 3A illustrates which SI field value should be received among the missing data packets when the T1 timer restarts, in the case where the field value of the SI field is "01", in order to generate the complete MAC-ehs SDU by combining with the segment of the MAC-ehs SDU. That is, in the case where the segment of the MAC-ehs SDU 315 with the field value "01" of the SI field is buffered in the buffer of the reordering block, the segment of the MAC-ehs SDU 315 with the field value "01" of the SI field is combined with the segment of the MAC-ehs SDU 311 with the field value "10" of the SI field or the segment of the MAC-ehs SDU 313 with the field value "11" of the SI field, so that the complete MAC-ehs SDU can be generated.

On the other hand, when the T1 timer expires under the circumstance of FIG. 3A, the complete MAC-ehs SDU among the data packets buffered in the buffers of the reordering block is sent to the RLC layer, but the segment of the MAC-ehs SDU is discarded unless there is a data packet to be combined. Therefore, in the case where the field value of the SI timer is "01", when the T1 timer restarts, the T1 time value of the T1 timer is not set to the time value determined by compensating for the standby time of the missing data packet but to the time value received from the upper layer as described in the previous exemplary embodiment of the present invention. In this case, it is possible to wait for the reception of the data packet to be combined with the segment of the MAC-ehs SDU buffered in the buffer of the reordering block.

Further, FIG. 3B illustrates which SI field value must be received among the missing data packets when the T1 timer restarts, in the case where the field value of the SI field is "11", in order to generate the complete MAC-ehs SDU by combining with the segment of the MAC-ehs SDU. That is, in the case where the segment of the MAC-ehs SDU 355 with the field value "11" of the SI field is buffered in the buffer of the reordering block, the segment of the MAC-ehs SDU 355 with the field value "11" of the SI field is combined with the segment of the MAC-ehs SDU 351 with the field value "10" of the SI field or the segment of the MAC-ehs SDU 353 with the field value "11" of the SI field, so that the complete MAC-ehs SDU can be generated. Herein, when the segment of the MAC-ehs SDU 355 with the field value "11" of the SI field is buffered in the buffer of the reordering block, the segment of the MAC-ehs SDU 357 with the field value "10" of the SI field or the segment of the MAC-ehs SDU 359 with the field value "11" of the SI field is also buffered in the buffer of the reordering block.

In the case where the field value of the SI field is "11", when the T1 timer restarts, the T1 time value of the T1 timer is not set to the time value determined by compensating for the standby time of the missing data packet but to the time value received from the upper layer as described in the previous exemplary embodiment of the present invention. In this case, it is possible to wait for the reception of the data packet to be combined with the segment of the MAC-ehs SDU buffered in the buffer of the reordering block.

Since the T1 time value of the T1 timer is set according to the field value of the SI field, the data packet received by the MAC layer can be sent to the RLC layer without being discarded as long as it can be. As such, the discarding of the received data packet is minimized, thereby being capable of increasing the efficiency of the wireless communication resource and decreasing the signaling overhead.

Next, a procedure of a reordering block in an HSPA+ communication system to compensate for the standby time of a missing data packet according to the first described exemplary embodiment of the present invention will be described with reference to FIG. 4.

Figure 4:
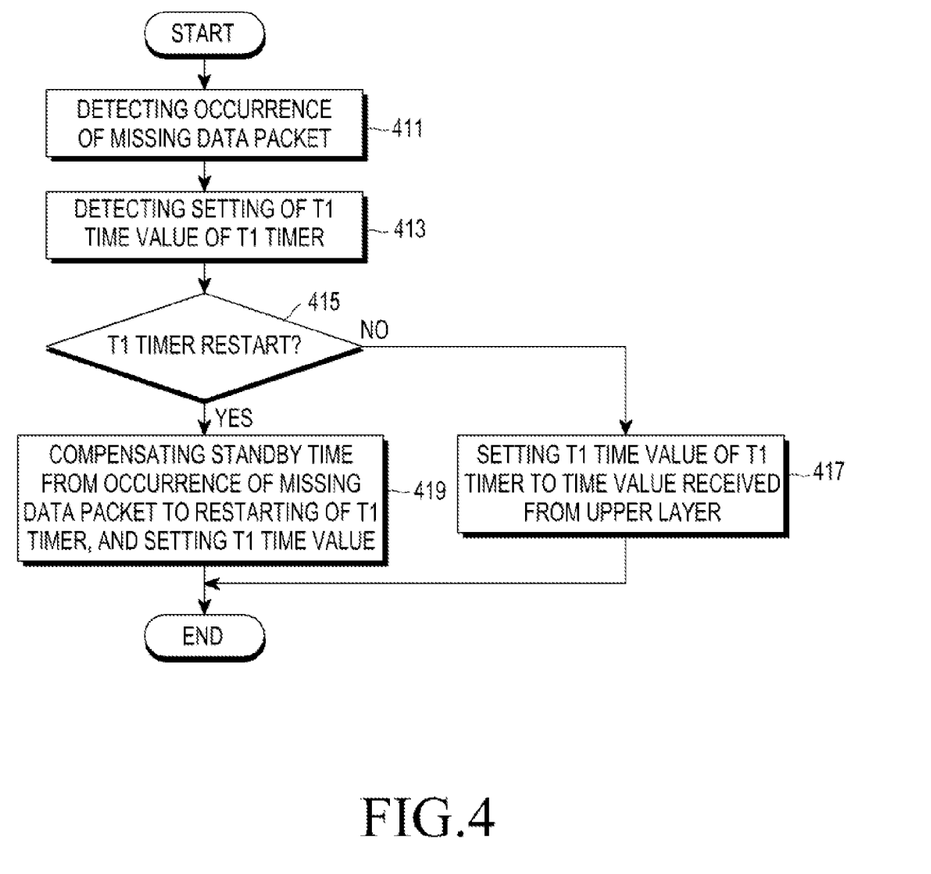
FIG. 4 is a flowchart illustrating a procedure for reordering data packets, in which a reordering block compensates for the standby times of missing data packets in an HSPA+ communication system according to an exemplary embodiment of the present invention.

FIG. 4 is a flowchart illustrating a procedure for reordering data packets, in which a reordering block compensates for the standby times of missing data packets in an HSPA+ communication system according to an exemplary embodiment of the present invention.

Referring to FIG. 4, the reordering block detects the occurrence of a missing data packet in step 411. In step 413, since the missing data packet occurs, the reordering block detects that the T1 time value of the T1 timer must be set. In step 415, the reordering block determines whether the T1 timer should restart. If it is determined in step 415 that the T1 timer does not need to restart, that is, if the T1 timer starts, the reordering block proceeds to step 417. In step 417, the reordering block sets the T1 time value of the T1 timer to a value received from the upper layer.

On the other hand, if it is determined in step 415 that the T1 timer needs to restart, the reordering block proceeds to step 419. In step 419, the reordering block sets the T1 time value by compensating for the standby time from the point of time when the missing data packet occurs to the point of time when the T1 timer restarts.

Next, a procedure of a reordering block in an HSPA+ communication system to compensate for the combining time of a missing data packet according to the second described exemplary embodiment of the present invention will be described with reference to FIG. 5.

Figure 5:
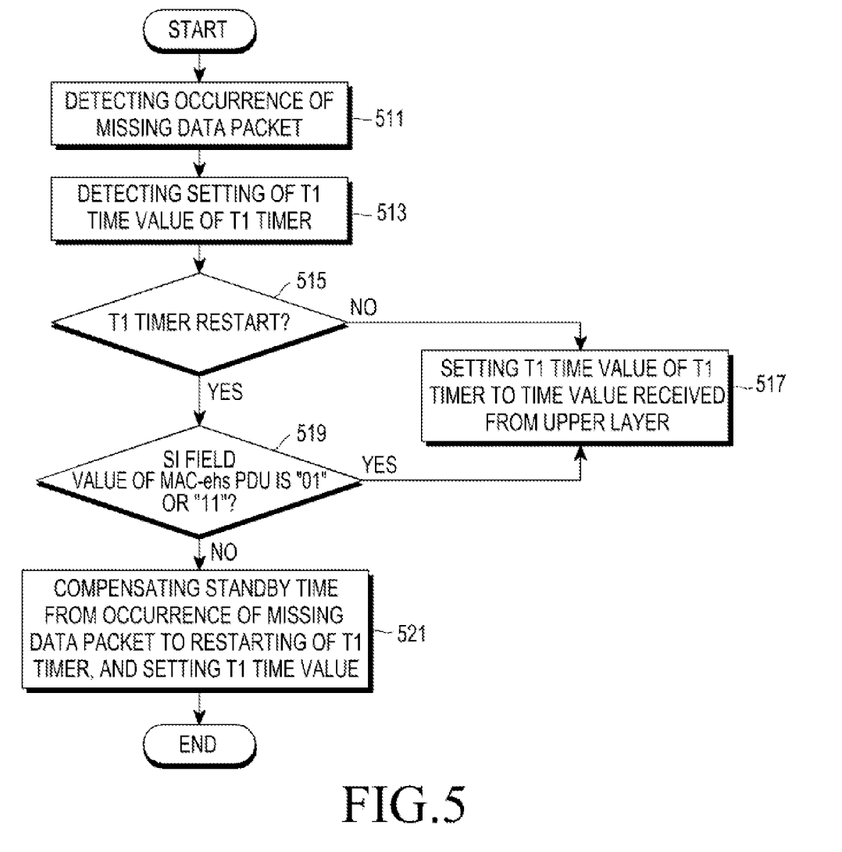
FIG. 5 is a flowchart illustrating a procedure for reordering data packets, in which a reordering block compensates for the combining times of missing data packets in an HSPA+ communication system according to an exemplary embodiment of the present invention.

FIG. 5 is a flowchart illustrating a procedure for reordering data packets, in which a reordering block compensates for the combining times of missing data packets in an HSPA+ communication system according to an exemplary embodiment of the present invention.

Referring to FIG. 5, steps 511 to 517 are substantially identical to steps 411 to 417 in FIG. 4, and the detailed description thereof will be omitted. If it is determined in step 515 that the T1 timer restarts, the reordering block proceeds to step 519. In step 519, the reordering block determines whether the SI field value of the MAC-ehs PDU in which the segment of the MAC-ehs SDU buffered in the buffer of the reordering block is included is "01" or "11". When it is determined in step 519 that the SI field value of the MAC-ehs PDU is "01" or "11", the reordering block proceeds to step 517.

On the other hand, if it is determined in step 519 that the SI field value of the MAC-ehs PDU is neither "01" nor "11", that is, when the SI field value of the MAC-ehs PDU is "00" or "10", the reordering block proceeds to step 521. In step 521, the reordering block sets the T1 time value by compensating for the standby time from the point of time when the missing data packet occurs to the point of time when the T1 timer restarts.

Next, an internal structure of a reordering block of an HSPA+ communication system according to an exemplary embodiment of the present invention will be described with reference to FIG. 6.

Figure 6:
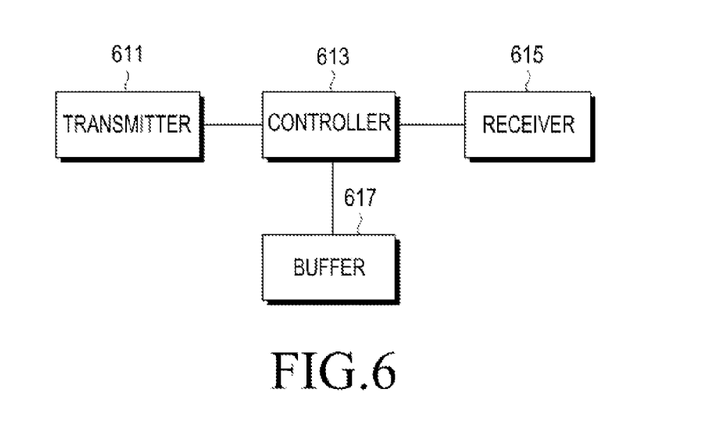
FIG. 6 is a diagram illustrating an internal structure of a reordering block of an HSPA+ communication system according to the exemplary embodiments of the present invention.

FIG. 6 is a diagram illustrating an internal structure of a reordering block of an HSPA+ communication system according to an exemplary embodiment of the present invention.

Referring to FIG. 6, the reordering block includes a transmitter 611, a controller 613, a receiver 615, and a buffer 617.

The controller 613 controls operations of the reordering block, and more particularly, the operation of the T1 timer. That is, the controller 613 sets the T1 time value of the T1 timer when the T1 timer restarts as described in the above exemplary embodiments of the present invention. Since the operation of setting the T1 time value of the T1 timer when the T1 timer restarts has been described above, another description thereof will be omitted. The receiver 615 receives the data packets, and the transmitter 611 sends the reordered data packets to a reassembly entity. Further, the buffer 617 accumulates the received data packets.

In FIG. 6, although the transmitter 611, the controller 613, the receiver 615, and the buffer 617 are illustrated as separate blocks, it is a matter of course that the transmitter 611, the controller 613, the receiver 615 and the buffer 617 may be implemented as one block.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reordering data packets in a communication system, the method comprising:
    detecting that a first time value of a timer used for reordering data packets needs to be set when a missing data packet occurs in receiving data packets;
    accumulating received data packets; and
    when the timer restarts, setting the first time value to a time value determined by compensating for a second time value which is used when the timer starts,
    wherein the timer starts when a first Transmission Sequence Number (TSN) of a received data packet is greater than a TSN of a data packet which is expected to be received immediately after data packets received already and when the timer is not in an active state,
    wherein the timer expires at a point of time when the second time value lapses,
    wherein the timer stops when a data packet with the same TSN as the first TSN is sent to a reassembly entity before the expiring of the timer, and
    wherein the timer restarts when a received data packet which cannot be sent to the reassembly entity is buffered in a buffer after the stopping or the expiring of the timer.

2. The method of claim 1, wherein, when the timer restarts, the setting of the first time value to the time value determined by compensating for the second time value which is used when the timer starts comprises:
    setting the first time value to a third time value determined by subtracting a standby time from a point of time when the missing data packet occurs to a point of time when the timer restarts from the second time value.

3. The method of claim 1, wherein, when the timer restarts, the setting of the first time value to the time value determined by compensating for the second time value which is used when the timer starts comprises:
    when the received data packet buffered in the buffer comprises a segment of a Medium Access Control (MAC)-enhanced high speed (ehs) Service Data Unit (SDU), setting the first time value to a third time value determined by subtracting a standby time from a point of time when the missing data packet occurs to a point of time when the timer restarts from the second time value, or setting the first time value to the second time value as it is in order to compensate for a combining time of the received data packet which is buffered in the buffer, according to a field value of a Segmentation Indication (SI) field included in a MAC-ehs Packet Data Unit (PDU) which includes the segment of the MAC-ehs SDU.

4. The method of claim 1, wherein, when the timer restarts, the setting of the first time value to the time value determined by compensating for the second time value which is used when the timer starts comprises:
    when the received data packet buffered in the buffer comprises a segment of a Medium Access Control (MAC)-enhanced high speed (ehs) Service Data Unit (SDU), setting the first time value to a third time value determined by subtracting a standby time from a point of time when the missing data packet occurs to a point of time when the timer restarts from the second time value, or setting the first time value to a value determined by adding a time value for compensating for a combining time of the received data packet buffered in the buffer and the third time value, according to a field value of a Segmentation Indication (SI) field included in a MAC-ehs Packet Data Unit (PDU) which includes the segment of the MAC-ehs SDU.

5. The method of claim 1, further comprising:
    when the timer expires, sending data packets with continuous TSNs smaller than a TSN of a data packet which is expected to be received immediately after the buffered data packets to a reassembly entity.

6. An apparatus for reordering data packets in a communication system, the apparatus comprising:
- a controller for detecting that a first time value of a timer used for reordering data packets needs to be set when a missing data packet occurs in receiving data packets, and, when the timer restarts, for setting the first time value to a time value determined by compensating for a second time value which is used when the timer starts; and
- a plurality of buffers for accumulating received data packets,
- wherein the timer starts when a first Transmission Sequence Number (TSN) is greater than a TSN of a data packet which is expected to be received immediately after data packets received already and when the timer is not in an active state,
- wherein the timer expires at a point of time when the second time value lapses,
- wherein the timer stops when a data packet with the same TSN as the first TSN is sent to a reassembly entity before the expiring of the timer, and
- wherein the timer restarts when a received data packet which cannot be sent to the reassembly entity is buffered in a buffer after the stopping or the expiring of the timer.

7. The apparatus of claim 6, wherein the controller sets the first time value to a third time value determined by subtracting a standby time from a point of time when the missing data packet occurs to a point of time when the timer restarts from the second time value.

8. The apparatus of claim 6, wherein, when the received data packet buffered in the buffer comprises a segment of a Medium Access Control (MAC)-enhanced high speed (ehs) Service Data Unit (SDU), the controller sets the first time value to a third time value determined by subtracting a standby time from a point of time when the missing data packet occurs to a point of time when the timer restarts from the second time value, or setting the first time value to the second time value as it is in order to compensate for a combining time of the received data packet which is buffered in the buffer, according to a field value of a Segmentation Indication (SI) field included in a MAC-ehs Packet Data Unit (PDU) which includes the segment of the MAC-ehs SDU.

9. The apparatus of claim 6, wherein, when the received data packet buffered in the buffer comprises a segment of a Medium Access Control (MAC)-enhanced high speed (ehs) Service Data Unit (SDU), the controller sets the first time value to a third time value determined by subtracting a standby time from a point of time when the missing data packet occurs to a point of time when the timer restarts from the second time value, or setting the first time value to a value determined by adding a time value for compensating for a combining time of the received data packet buffered in the buffer and the third time value, according to a field value of a Segmentation Indication (SI) field included in a MAC-ehs Packet Data Unit (PDU) which includes the segment of the MAC-ehs SDU.

10. The apparatus of claim 6, wherein, when the timer expires, the controller sends data packets with continuous TSNs smaller than a TSN of a data packet which is expected to be received immediately after the buffered data packets to a reassembly entity.

11. A method for reordering data packets in a communication system, the method comprising:
- receiving and buffering data packets;
- determining that a data packet is missing from among the received data packets;
- determining that a first time value of a timer used for reordering the missing data packet needs to be set;
- setting the first time value to a value received from an upper layer if the timer does not need to be restarted; and
- setting the first time value to a value determined by compensating for a second time value if the timer needs to be restarted.

12. The method of claim 11, further comprising starting the timer when a first Transmission Sequence Number (TSN) of a received data packet is greater than a TSN of a data packet which is expected to be received immediately after data packets received already and when the timer is not in an active state,
- wherein the timer expires at a point of time when the second time value lapses,
- wherein the timer stops when a data packet with the same TSN as the first TSN is sent to a reassembly entity before the expiring of the timer, and
- wherein the timer restarts when a received data packet which cannot be sent to the reassembly entity is buffered in a buffer after the stopping or the expiring of the timer.

13. The method of claim 11, wherein, when the timer restarts, the setting of the first time value to the value determined by compensating for the second time value comprises:
- setting the first time value to a third time value determined by subtracting a standby time from a point of time when the missing data packet occurs to a point of time when the timer restarts from the second time value.

14. The method of claim 11, wherein, when the timer restarts, the setting of the first time value to the time value determined by compensating for the second time value comprises:
- when the received data packet buffered in the buffer comprises a segment of a Medium Access Control (MAC)-enhanced high speed (ehs) Service Data Unit (SDU), setting the first time value to a third time value determined by subtracting a standby time from a point of time when the missing data packet occurs to a point of time when the timer restarts from the second time value, or setting the first time value to the second time value as it is in order to compensate for a combining time of the received data packet which is buffered in the buffer, according to a field value of a Segmentation Indication (SI) field included in a MAC-ehs Packet Data Unit (PDU) which includes the segment of the MAC-ehs SDU.

15. The method of claim 11, wherein, when the timer restarts, the setting of the first time value to the time value determined by compensating for the second time value comprises:
- when the received data packet buffered in the buffer comprises a segment of a Medium Access Control (MAC)-enhanced high speed (ehs) Service Data Unit (SDU), setting the first time value to a third time value determined by subtracting a standby time from a point of time when the missing data packet occurs to a point of time when the timer restarts from the second time value, or setting the first time value to a value determined by adding a time value for compensating for a combining time of the received data packet buffered in the buffer and the third time value, according to a field value of a Segmentation Indication (SI) field included in a MAC-ehs Packet Data Unit (PDU) which includes the segment of the MAC-ehs SDU.

16. The method of claim 12, further comprising:
- when the timer expires, sending data packets with continuous TSNs smaller than a TSN of a data packet which is expected to be received immediately after the buffered data packets to a reassembly entity.

* * * * *